(12) United States Patent
Bumm et al.

(10) Patent No.: US 7,717,996 B2
(45) Date of Patent: May 18, 2010

(54) SPRAYABLE COATING AGENT, ITS PRODUCTION, FURTHER PROCESSING AND USE THEREOF

(75) Inventors: Christian Bumm, Höhenbahnweg 100, D-63927 Bürgstadt (DE); Walter Frehse, Unterfranken (DE); Andreas Weigand, Werbach (DE)

(73) Assignee: Christian Bumm, Werbach (DE)

( * ) Notice: Subject to any disclaimer, the term of this patent is extended or adjusted under 35 U.S.C. 154(b) by 1186 days.

(21) Appl. No.: 10/530,444

(22) PCT Filed: Oct. 2, 2003

(86) PCT No.: PCT/EP03/10910

§ 371 (c)(1),
(2), (4) Date: Apr. 1, 2005

(87) PCT Pub. No.: WO2004/033572

PCT Pub. Date: Apr. 22, 2004

(65) Prior Publication Data

US 2006/0155013 A1    Jul. 13, 2006

(30) Foreign Application Priority Data

Oct. 7, 2002   (DE) ................................ 102 46 632

(51) Int. Cl.
| C09D 101/10 | (2006.01) |
| C09D 101/12 | (2006.01) |
| C09D 101/14 | (2006.01) |
| C08G 79/02  | (2006.01) |
| B05D 1/28   | (2006.01) |
| B05D 1/40   | (2006.01) |

(52) U.S. Cl. .............. 106/164.01; 106/164.5; 106/501.1; 106/164.1; 106/167.01; 106/204.01; 106/204.3; 427/180; 524/34; 524/35

(58) Field of Classification Search ............ 106/164.01, 106/164.5, 501.1, 164.1, 167.01, 164.51, 106/204.01, 204.3; 524/34, 35; 427/180
See application file for complete search history.

(56) References Cited

U.S. PATENT DOCUMENTS 2,547,989 A  *  4/1951  Wiley ......................... 264/77
5,395,438 A  *  3/1995  Baig et al. ............. 106/164.51

FOREIGN PATENT DOCUMENTS

| DE | 4317957     | 12/1984 |
| DE | 3606167     | 8/1987  |
| DE | 4126970     | 2/1993  |
| DE | 9402123     | 5/1994  |
| DE | 29604493    | 7/1996  |
| DE | 29613699    | 12/1996 |
| DE | 19714729    | 10/1998 |
| DE | 19706899    | 11/1998 |
| DE | 19831856    | 1/1999  |
| EP | 0792923     | 9/1997  |
| WO | WO-03033570 | 4/2003  |

OTHER PUBLICATIONS

Ilyina et al, "Using of Biodac . . . ", Biocatalysis-2000 Fundamentals & Applications, vol. 41, No. 6, Supplement (2000) pp. 135-138.*
"Biodac®" product information brochure, KADANT, (no date available).*
"Biodac® Dec. 20 Mesh", Biodac® Sizing and Application Information—Biodac Dec. 20 Mesh / SGN 140-160, KADANT, (no date available).*

* cited by examiner

*Primary Examiner*—David M Brunsman
(74) *Attorney, Agent, or Firm*—Jonathan Myers; Andrew Wilford

(57) ABSTRACT

A sprayable coating agent is disclosed in the form of granules with which the granules are compacted to form a pressed piece, subsequently ground up and optionally sieved, whereby the granules have the following particle-size distribution: 0%-40% by weight: 0-600 microns; 5%-55% by weight: 600-1250 microns; 5%-95% by weight: >1250 microns; or 15% by weight: 0-800 microns; 0%-85% by weight: 800-2000 microns; 0%-15% by weight: >2000 microns. Likewise disclosed are its production, further processing and use for internal and external applications.

71 Claims, 11 Drawing Sheets

US 7,717,996 B2

SPRAYABLE COATING AGENT, ITS PRODUCTION, FURTHER PROCESSING AND USE THEREOF

This is a 371 of PCT/EP03/10910, filed Oct. 2, 2003.

FIELD OF THE INVENTION

The invention relates to a sprayable coating agent, its production, its further processing and its use for the decorative coating, finishing or structuring of surfaces, particularly walls and ceilings.

BACKGROUND OF THE INVENTION

German utility models DE 296 21 864 U1 and DE 296 04 493 U1 as well as German preliminary published applications DE 43 17 957 A1 and DE 36 06 167 A1 disclose sprayable coating agents for surface-structured wall or ceiling coverings as alternatives to liquid wood chips or wood-chip wallpaper. This is a material mixture consisting of cellulose fibers with curing agents, binders, colorants and water. Additives made of other cellulosic and inorganic materials are likewise claimed. The surface structure is changed by varying the air pressure during the spraying and by changing the consistency of the compound. According to German utility model DE 296 04 493 U1, a surface structure matching rough plaster is created when the air blisters burst.

Likewise known are dry mixtures based on cellulose fibers that dissolve in water and that can be employed to cover walls and ceilings. Familiar commercial products for covering walls and ceilings are, for example, Naturlan Nature-Floc® on the basis of cotton fibers as well as Faserit on the basis of wood, marble meal, loading materials and vegetable adhesives.

The above-mentioned coating agents and methods, however, only allow the creation of surface structures that are sprayed with a semi-fluid, pasty compound employing a variable supply of compressed air. Since the cellulose breaks down into fine fibers, this structure is fundamentally different from purely grainy structures of the type known from textured plaster (grainy loading materials such as marble meal, sand or silicate). It is difficult and complex to establish and reproduce a uniform surface structure via the air pressure and this can only be done by an experienced specialist. In the case of textured and structured plaster, it is also difficult to apply a uniform grainy structure onto a wall or ceiling. Overhead work is tricky and can only be performed with skilled craftsmanship.

OBJECT OF THE INVENTION

Therefore, it is the objective of the invention to create another sprayable coating agent that serves to make surface-structured wall or ceiling coverings and that allows simple, fast and cost-efficient coating of surfaces, structural diversity and uncomplicated processing with machines. Furthermore, the surface structure should be uniform and visually comparable to the classic rough plaster structure after just a single coating step, without retouching.

SUMMARY OF THE INVENTION

Therefore, the invention relates to a sprayable coating agent in the form of granules containing cellulose and/or regenerated cellulose and/or cellulosic raw materials as well as mixtures thereof with synthetic fibers and/or inorganic fibers and/or inorganic, coarse-grained, fine-grained or pulverulent substances and/or organic polymer materials and/or auxiliaries or additives, whereby the starting materials and/or mixtures thereof are compacted to form a pressed piece, subsequently ground up and optionally sieved, so that the granules have a density of 1 $g/cm^3$ to 5 $g/cm^3$, a moisture content of 1% to 20%, a bulk density of 150 g/l to 1500 g/l and so that the ground up and optionally sieved granules have the following particle-size distribution:

| | |
|---|---|
| 0-40% by weight | 0-600 μm |
| 5-55% by weight | 600-1250 μm |
| 5-95% by weight | >1250 μm |
| or | |
| 0-15% by weight | 0-800 μm |
| 10-85% by weight | 800-2000 μm |
| 0-15% by weight | >2000 μm. |

Accordingly, the starting materials and/or mixtures thereof are compacted to form a pressed piece in a generally known manner using a commercially available compactor. In this context, we hereby make reference to, for instance, Ullmanns Enzyklopädie der technischen Chemie [Ullmann's encyclopedia of industrial chemistry], $4^{th}$ Edition, 1972, Volume 2, pages 315 to 320 regarding briquetting. Flat-matrix presses (e.g. type 38-70 manufactured by the Kahl company) should also be mentioned here by way of an example. The pressed piece is subsequently ground up as a function of the application and optionally sieved. As far as the grinding operation is concerned, we hereby make reference to Ullmann, op. cit., Volume 2, pages 1 to 23 regarding comminution.

Any type of cellulosic material can be used for the compacting. In order to improve the product properties and/or to achieve certain visual effects, synthetic fibers and/or inorganic fibers and/or organic substances and/or inorganic substances and/or other auxiliaries and additives can be admixed with the cellulose and/or with the cellulosic raw materials prior to the compacting operation.

Additional advantageous features of the invention are defined in the subordinate claims. Accordingly, the density of the granules preferably ranges from 1.2 $g/cm^3$ to 3.1 $g/cm^3$. The granules preferably contain 2% to 12% water. The bulk density of the granules is preferably 170 g/l to 600 g/l.

The finer granules preferably exhibit the following particle-size distribution:

| | |
|---|---|
| 0.2-5% by weight | <100 μm |
| 1-15% by weight | 100-250 μm |
| 4-25% by weight | 250-400 μm |
| 8-30% by weight | 400-600 μm |
| 10-35% by weight | 600-800 μm |
| 15-40% by weight | 800-1250 μm |
| 7-20% by weight | >1250 μm. |

The coarser granules preferably exhibit the following particle-size distribution:

| | |
|---|---|
| 5-10% by weight | <800 μm |
| 10-50% by weight | 800-1250 μm |
| 25-70% by weight | 1250-1600 μm |
| 7-15% by weight | 1600-2000 μm |
| 3-5% by weight | >2000 μm. |

The cellulose and the cellulosic raw materials can be cotton, linters, pulp, paper, flax, hemp, jute, cuprammonium silk, rayon, lyocel, colored fibers, wood, sawdust, wood shavings, straw and/or cork or else mixtures thereof. The cellulosic proportion in the granules ranges from 40% to 100% by weight, preferably from 60% to 90% by weight.

The synthetic fibers can be polyester, polyamide, polyacrylonitrile, polyurethane, polyethylene, polypropylene and/or acetate fibers. The proportion of synthetic fibers in the granules ranges from 0% to 60% by weight, preferably from 5% to 30% by weight.

The inorganic fibers can be silicate, water glass, glass, metal and/or carbon fibers. The proportion of inorganic fibers in the granules ranges from 0% to 60% by weight, preferably from 5% to 30% by weight.

The inorganic substances can be marble, quartz sand, silicic acid, chalk, gypsum, carbonates and/or metal oxides. The proportion of inorganic additives in the granules ranges from 0% to 40% by weight, preferably from 5% to 25% by weight.

The organic substances can be polyethylene, polypropylene, polytetrafluoroethylene (Teflon®), polystyrene foam (Stryropor®), acrylates, rubber and/or other modified and unmodified polysaccharides. The proportion of organic substances in the granules ranges from 0% to 40% by weight, preferably from 5% to 25% by weight.

The auxiliaries and additives can be organic or inorganic substances, organic or inorganic colorants, binders, curing agents, dispersants, preservatives, fungicides, mica, flame-resistant materials, nanoparticles of any type and/or water. The proportion of auxiliaries or additives in the granules ranges from 0% to 40% by weight, preferably from 1% to 25% by weight.

The fibrous and coarse-grained starting materials are ground up before the granulation by means of familiar methods, for example, using a Bexmill BM or a sieving mill FC, manufactured by Hosokawa Bepex GmbH, or a Condux cutting mill or a hammer mill.

The grinding stock exhibits the following particle-size distribution:

| | | | |
|---|---|---|---|
| 45-65% by weight, | preferably | 50-60% by weight | >40 µm |
| 25-45% by weight, | preferably | 30-40% by weight | >50 µm |
| 5-20% by weight, | preferably | 10-15% by weight | >63 µm |
| 0-10% by weight, | preferably | 2-5% by weight | >90 µm |
| 0-5% by weight, | preferably | 1-3% by weight | >100 µm. |

The pre-ground starting materials or mixtures thereof are compacted to form a pressed piece in a generally known manner using a commercially available compactor. The pressed piece is then ground up to a specific particle size as a function of the desired structure, the desired visual effect or the desired roughness of the surface to be created, and then optionally sieved using, for instance, a vibratory sieving machine, in order to remove certain fines.

Some of the auxiliaries or additives can be admixed with the starting materials or material mixtures prior to the compacting, grinding or sieving operations.

Water is added to the starting materials or material mixtures prior to the compacting, grinding or sieving operations.

The granules are pre-mixed with water, optionally with the addition of conventional auxiliaries and/or additives, and then stored in plastic containers, or else mixed directly on site to yield a stiff, semi-fluid, pasty compound and subsequently applied in one single operation at any desired layer thickness and without seams using, for example, a commercially available funnel-type spray gun. The desired surface structure is determined by the granularity of the granules. The coating compound can also be applied onto the wall and/or ceiling surface to be coated with familiar techniques using, for instance, a trowel or spatula.

A decisive aspect is that the cellulosic granules retain their consistency, even in the ready-made mixtures, and do not break down into fibers like the known coating agents do. Experiments have shown that the semi-fluid, pasty granule mixture retains its consistency even after a prolonged pot life, that is to say, it remains stable and unchanged.

For wall or ceiling coverings, as an alternative to the ready-made pasty granule mixture, a dry granule mixture can be prepared that contains the granules and the auxiliaries or additives suitable for the application case in question. All that needs to be done is to stir the dry granule mixture with water at the appropriate ratio on site, after which it can be applied. This translates into savings in terms of weight and storage space. Moreover, the user can employ the dry granule mixture as needed.

When the coating compound is prepared, colored fibers and/or metallic fibers and/or metallic particles and/or mother-of-pearl and/or inorganic and/or organic dyed particles can be optionally added in order to achieve certain visual effects.

The granules and/or the granule mixtures are suitable for interior and exterior applications, but particularly for interior applications.

The surface structure thus obtained is clearly distinct from the coating agents on the basis of cellulose fibers known so far for walls and ceilings. The material is very easy to process and it gives rise to an attractive, seamless rough plaster structure that can be applied onto neutral substrates without primers.

Thanks to its good covering power and ply bond, the coating mixture can usually be applied directly onto existing wallpaper or other surfaces that are in need of renovation. The color and structure remain consistent, these wall coverings can be painted over, they are rugged, can be repaired at any time and are also suitable for use in wet rooms. Unlike conventional coatings, the applied coating dries quickly and cures uniformly.

The present invention will now be described in greater detail with reference to examples of embodiments.

The present invention will first be explained by figures, whereby samples according to the state of the art and according to the invention are applied onto a wall at distances of 100 cm, 50 cm and 25 cm.

BRIEF DESCRIPTION OF THE DRAWINGS

The following is shown.

DETAILED DESCRIPTION OF THE DRAWING

As can be seen in FIGS. 2, 2a, 2b, 3, 3a, 3b, 4, 4a and 4b according to the invention, coating agents on the basis of cellulosic granules yield completely different surface structures from those obtained with the prior-art coating agents according to FIGS. 1, 1a, 1b, 5, 5a, 5b, 6, 6a, 6b, 7, 7a, 7b. By means of the particle-size distribution, the surface structure of a coating can be varied as desired in a very simple manner. More details will be found in the examples of embodiments below.

The present invention will also be explained in greater detail by means of the following embodiment examples and comparative examples.

The following measuring methods were employed to characterize the granules, granule mixtures and coating compound as well as the starting materials and the comparative products:

1. Bulk Density

The sample was filled into a 1000-ml measuring flask and the weight was determined by means of weighing.

2. Density

The density was determined using a helium gas pyknometer (Pyknomatic 200 manufactured by the Porotec company).

3. Sieve Size a. Determining the sieve size of materials having short or long fibers The sieve size of short-fiber and long-fiber materials is determined with an Alpine air-jet sieve; running time of one minute.

b. Determining the sieve size of granules and granule mixtures

The sieve size of granules and granule mixtures is determined using an AS 200 basic analytical sieving machine manufactured by the Retsch company and an analytical sieve according to DIN ISO 3310/1 having a diameter of 200 mm and a height of 50 mm.

4. Viscosity Determination

The viscosity (consistency) of the coating compound was determined at 20° C. [68° F.] using a rotational viscosimeter manufactured by the Brookfield company, type RVT, and spindle no. 6, at 20 rpm and 50 rpm.

Production of the Granules

A total of 40 kg of pre-ground cellulose (pulp), type 402-2b, manufactured by the Mikro-Technik company, and 3 liters of water are placed into a 300-liter Drais mixer. The mixture is intensely stirred for 20 minutes. Hard shells are made using a PHARMAPAKTOR L200/50P manufactured by Hosokawa Bepex GmbH, fitted with a 12-mm corrugated-profile roller, laterally closed, and a cylindrical/conical screw, at a contact force ranging from 130 kN to 150 kN. Subsequently, the shells are ground up employing a sieving mill manufactured by Hosokawa Bepex GmbH and fitted with a 3 mm-mesh sieve; the grinding stock is then sieved with a vibratory sieving machine manufactured by Hosokawa Bepex GmbH and fitted with a 2 mm-mesh sieve insert.

COMPARATIVE EXAMPLE 1

Figure 1:
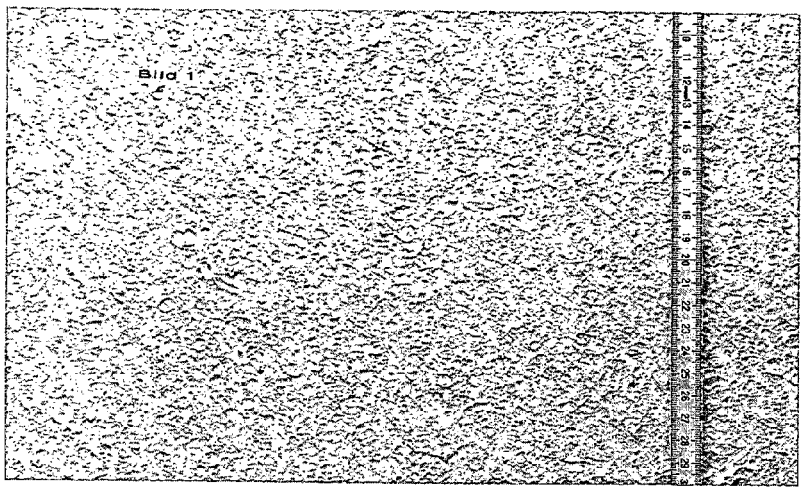
FIG. 1—a surface structure according to the state of the art on the basis of Comparative Example 1 below (taken at a distance of 1 meter)
Figure 1A:
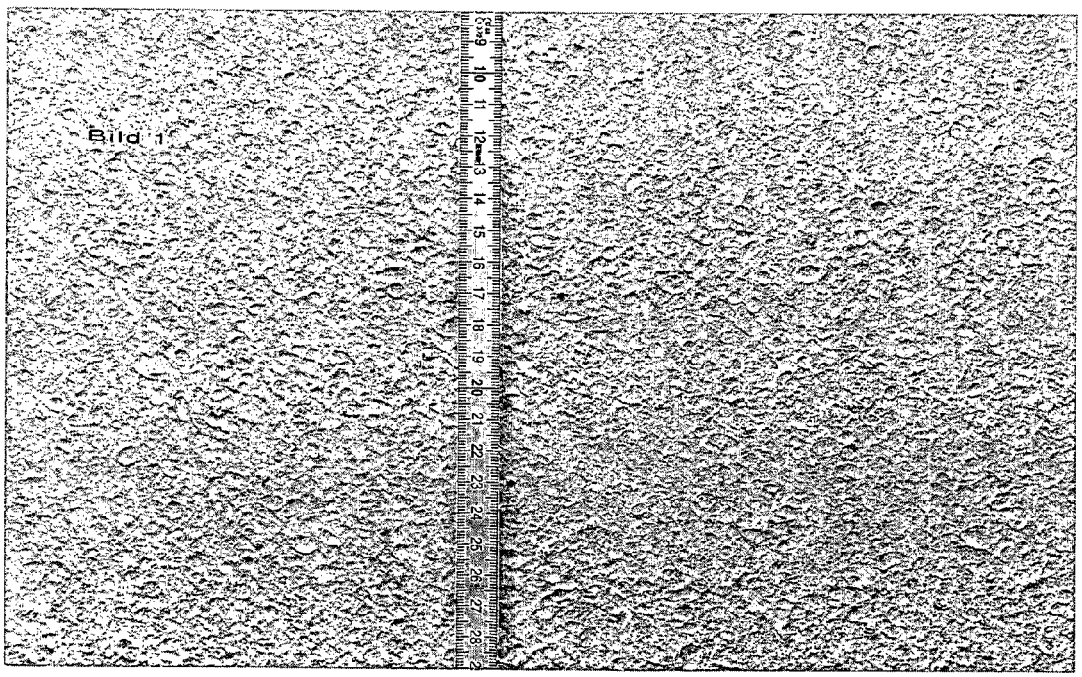
FIGS. 1a and 1b—magnified views of the structure from FIG. 1, taken at a distance of 50 cm and 25 cm.
Figure 1B:
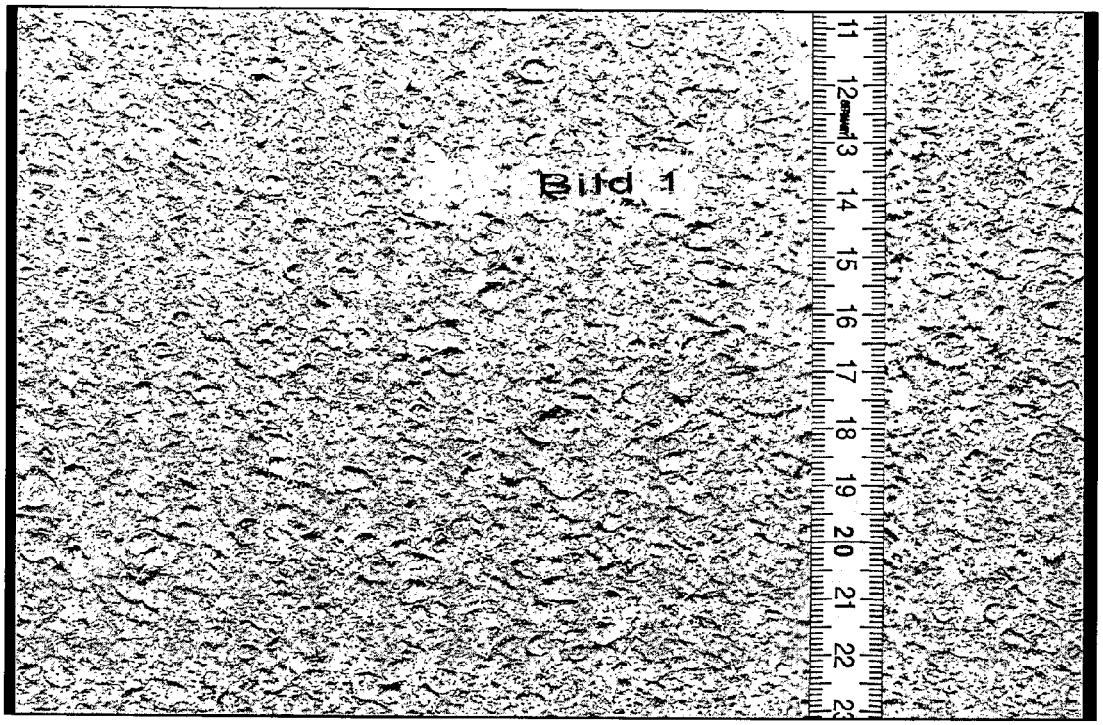

One liter (1550 grams) of acrylic exterior paint and 1.5 liters of water are added to 2 liters (256 grams) of pre-ground cellulose (pulp), type 402-2b, manufactured by the Mikro-Technik company. Subsequently, the mixture is thoroughly stirred with an agitator. The result is a pasty, sprayable compound that can be sprayed onto a wall employing a commercially available funnel-type spray gun operated using air pressure (1 to 6 bar) with a 4-mm to 8-mm nozzle disk (FIG. 1 and FIG. 1a).

The viscosity of the coating compound is 3100 mPas.

The pre-ground cellulose has the following particle-size distribution (with an Alpine air-jet sieve):

| | |
|---|---|
| 57.7% by weight | >40 μm |
| 34.7% by weight | >50 μm |
| 11.4% by weight | >63 μm |
| 3.3% by weight | >90 μm |
| 0.0% by weight | >100 μm. |

The bulk density of the ground-up cellulose is 128 g/l and the moisture content is 2.4%.

It can be clearly seen in FIGS. 1 and 1a that the surface structure of the coating with cellulose fibers is completely different from the surface structure of the coatings with cellulosic granules (see FIG. 2, FIG. 2a, FIG. 3, FIG. 3a, FIG. 4 and FIG. 4a). The surface structure of the coating is comparable to the surface structures of coatings made with commercially available coating agents (see FIG. 5, FIG. 5a, FIG. 6, FIG. 6a, FIG. 7 and FIG. 7a). In this case, the surface structure is formed primarily by the bursting of the air blisters. Only very limited variations of the surface structure are possible with coatings on the basis of cellulosic fibers.

EXAMPLE 1

Figure 2:
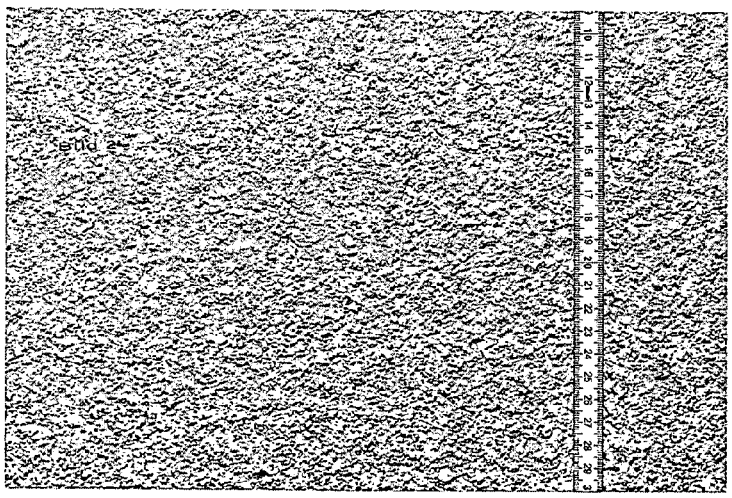
FIG. 2—a surface structure according to the invention on the basis of Example 1 below.
Figure 2A:
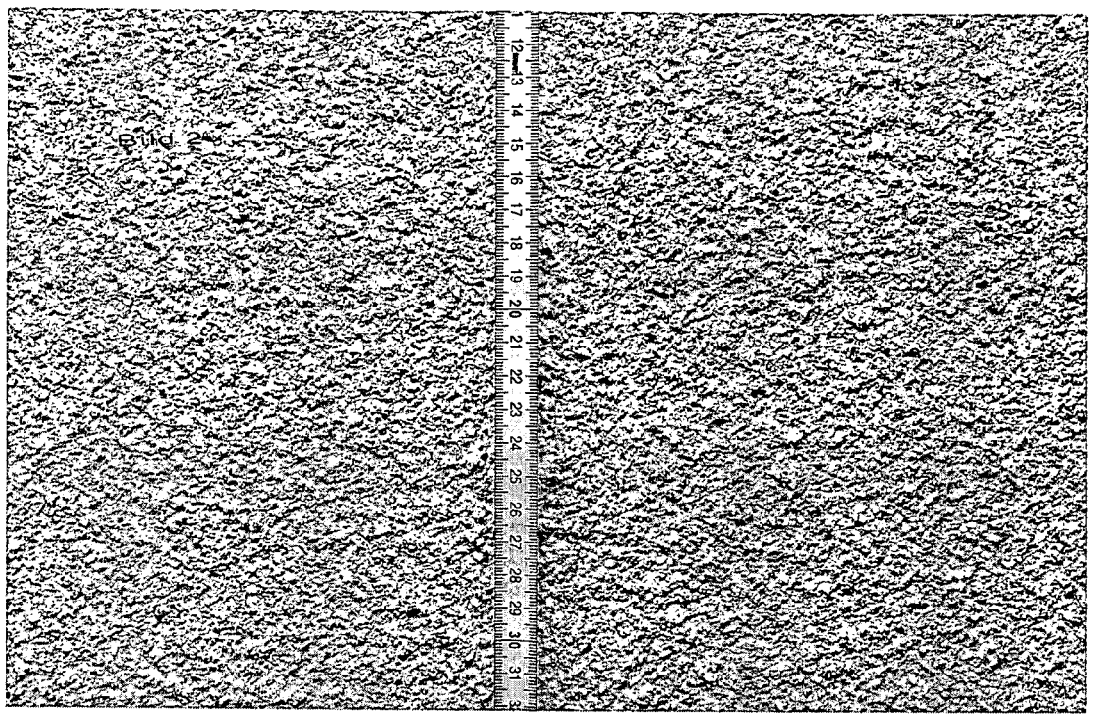
FIGS. 2a and 2b—magnified views of the structure from FIG. 2.
Figure 2B:
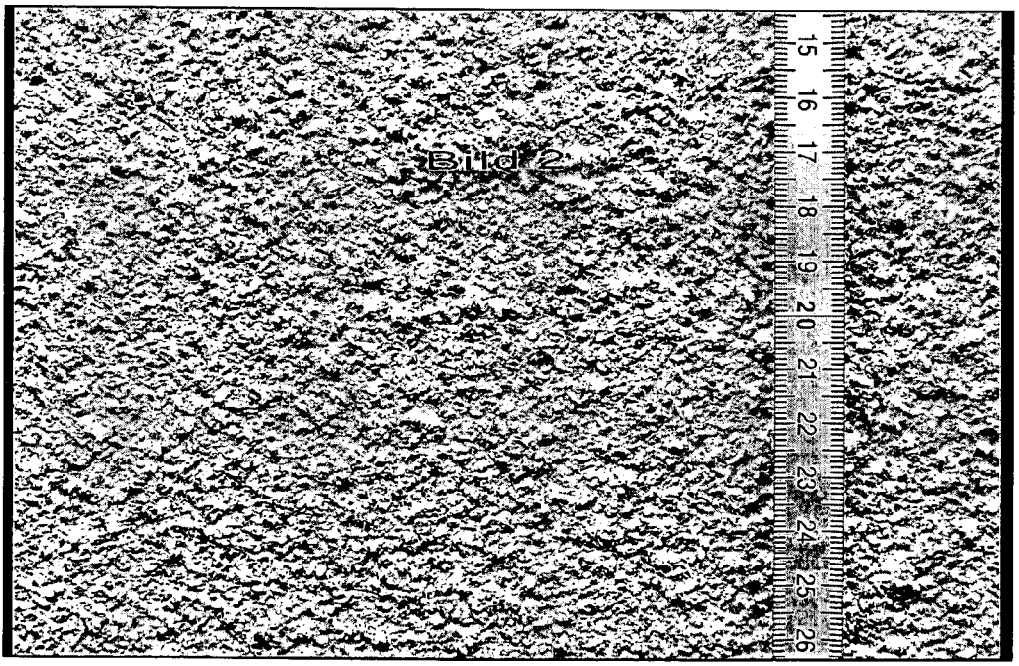

One liter (1550 grams) of acrylic exterior paint and 1.8 liters of water are added to 2 liters (704 grams) of pre-ground, non-sieved granules. Subsequently, the mixture is thoroughly stirred with an agitator. The result is a pasty, sprayable compound that can be sprayed onto a wall employing a commercially available funnel-type spray gun operated using air pressure (1 to 6 bar) with a 4-mm to 8-mm nozzle disk (FIG. 2, FIG. 2a and FIG. 2b).

The viscosity of the coating compound is 5400 mPas.

The pre-ground, non-sieved granules have the following particle-size distribution (using a 200 basic analytical sieving machine):

| | |
|---|---|
| 2.5% by weight | <100 μm |
| 18.8% by weight | 100-250 μm |
| 7.5% by weight | 250-400 μm |
| 11.9% by weight | 400-600 μm |
| 27.1% by weight | 800-1250 μm |
| 19.7% by weight | >1250 μm. |

The bulk density of the pre-ground, non-sieved granules is 352 g/l and the moisture content is 5.7%.

EXAMPLE 2

Figure 3:
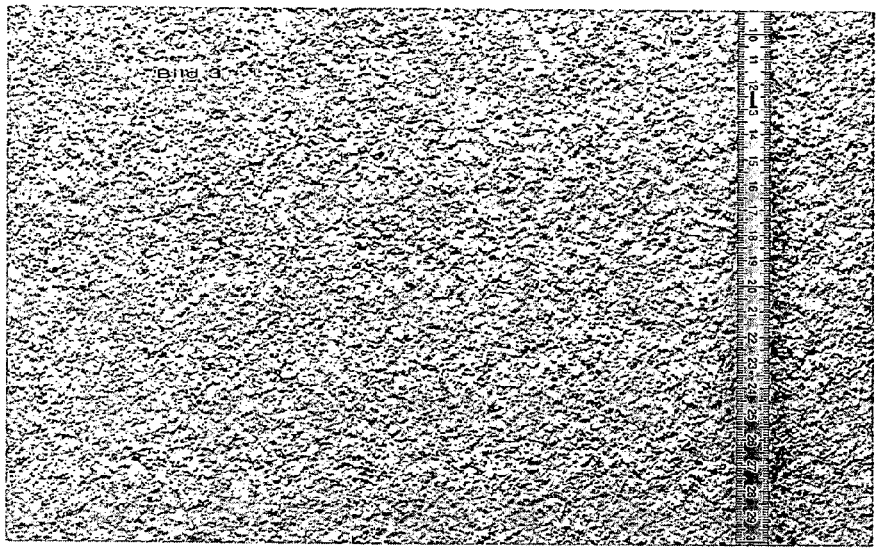
FIG. 3—a surface structure according to Example 2 below.
Figure 3A:
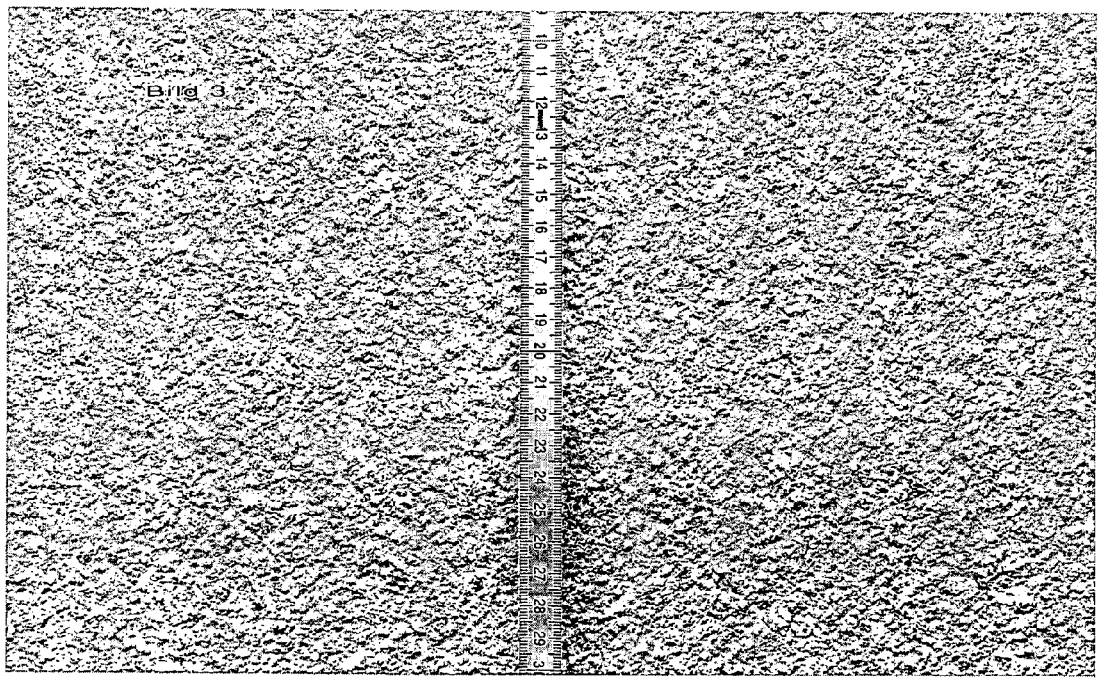
FIGS. 3a and 3b—magnified views of the structure from FIG. 3.
Figure 3B:
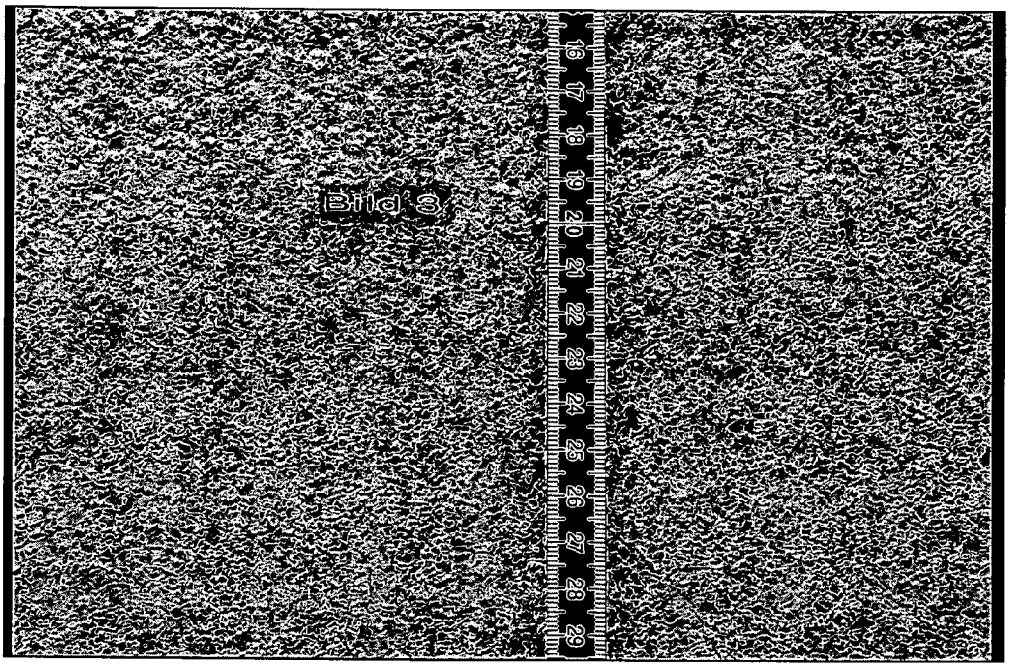

One liter (1550 grams) of acrylic exterior paint and 1.8 liters of water are added to 2 liters (652 grams) of sieved granules. Subsequently, the mixture is thoroughly stirred with an agitator. The result is a pasty, sprayable compound that can be sprayed onto a wall employing a commercially available funnel-type spray gun operated using air pressure (1 to 6 bar) with a 4-mm to 8-mm nozzle disk (FIG. 3, FIG. 3a and FIG. 3b).

The viscosity of the coating compound is 2500 mPas.

The sieved granules have the following particle-size distribution (with a 200 basic analytical sieving machine):

| | |
|---|---|
| 6.1% by weight | <100 μm |
| 4.3% by weight | 100-250 μm |
| 6.2% by weight | 250-400 μm |
| 14.0% by weight | 400-600 μm |
| 14.5% by weight | 600-800 μm |
| 43.1% by weight | 800-1250 μm |
| 12.0% by weight | >1250 μm. |

The bulk density of the sieved granules is 326 g/l and the moisture content is 5.9%.

EXAMPLE 3

Figure 4:
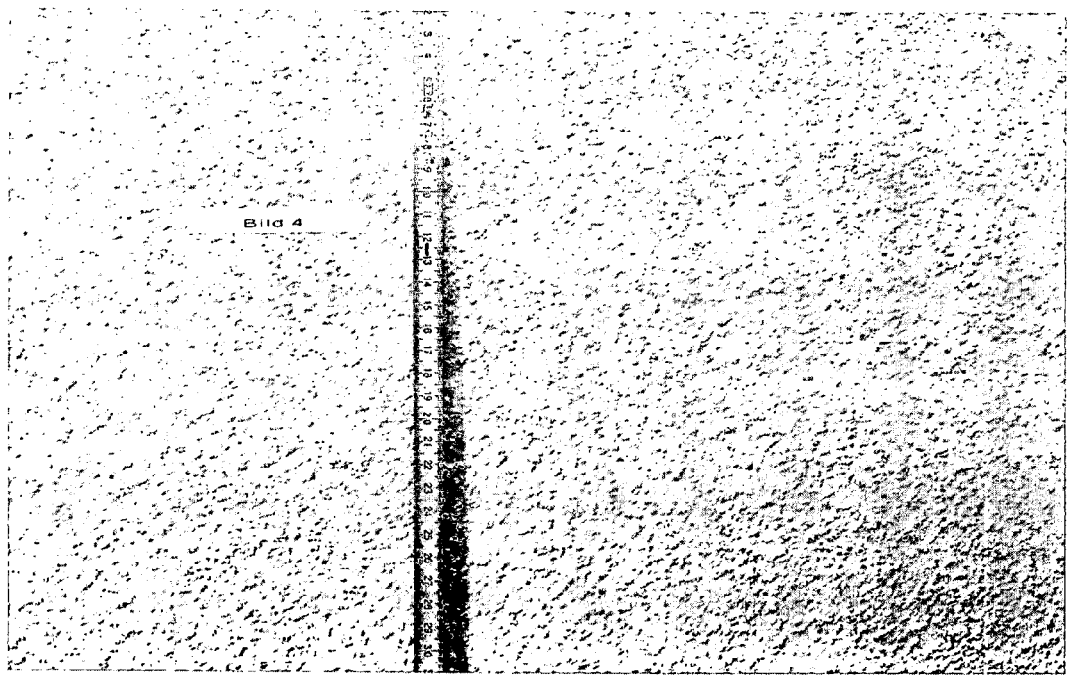
FIG. 4—a surface structure according to the invention on the basis of Example 3 below.
Figure 4A:
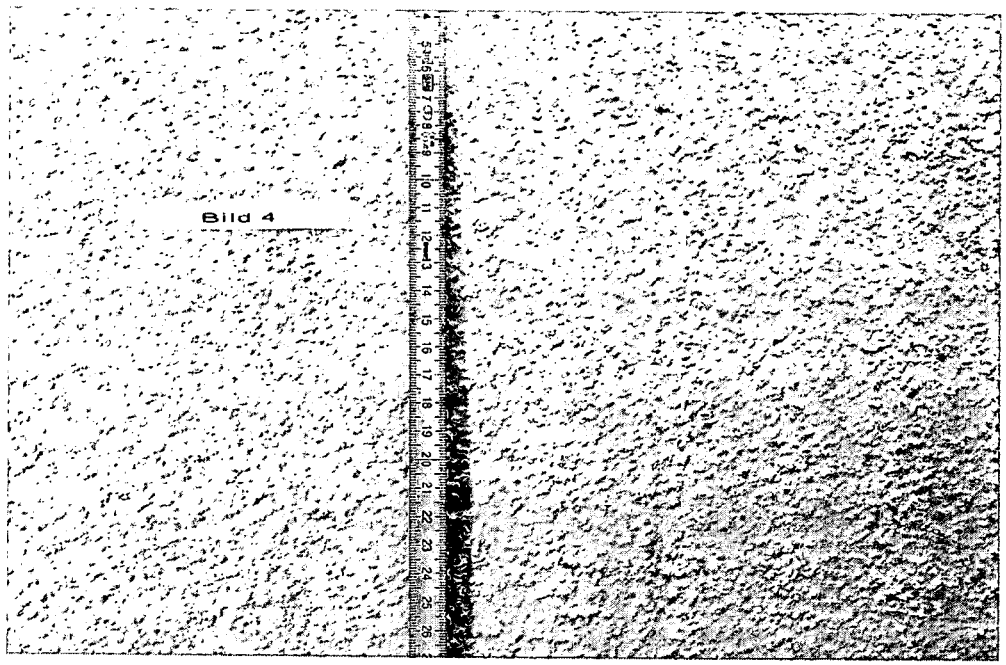
FIGS. 4a and 4b—magnified views of the structure from FIG. 4.
Figure 4B:
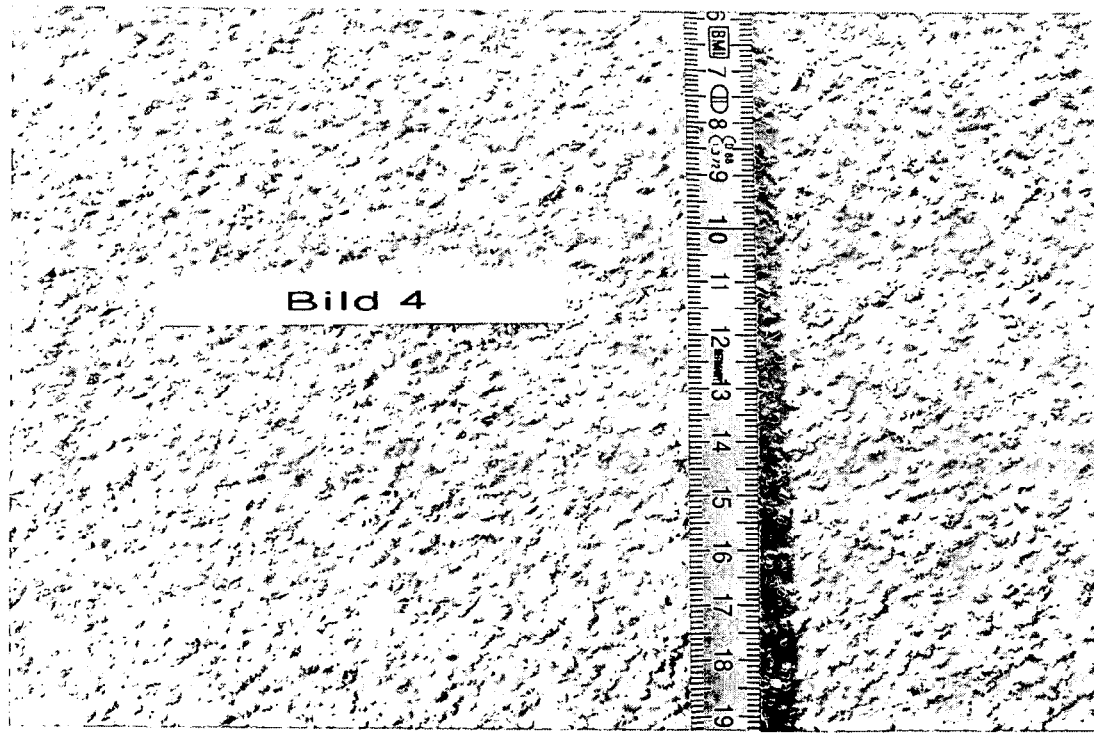

One liter (1550 grams) of acrylic exterior paint and 1.6 liters of water are added to 2 liters (930 grams) of coarse granules. Subsequently, the mixture is thoroughly stirred with an agitator. The result is a pasty, sprayable compound that can be sprayed onto a wall employing a commercially available funnel-type spray gun operated using air pressure (1 to 6 bar) with a 4-mm to 8-mm nozzle disk (FIG. 4, FIG. 4a and FIG. 4b).

The viscosity of the coating compound is 2800 mpas.

The coarse granules have the following particle-size distribution (with a 200 basic analytical sieving machine):

| | |
|---|---|
| 0.4% by weight | <800 μm |
| 9.6% by weight | 800-1250 μm |
| 67.5% by weight | 1250-1600 μm |
| 22.2% by weight | 1600-2000 μm |
| 0.4% by weight | >2000 μm. |

The bulk density of the coarse granules is 465 g/l and the moisture content is 6.3%.

COMPARATIVE EXAMPLE 2

Figure 5:
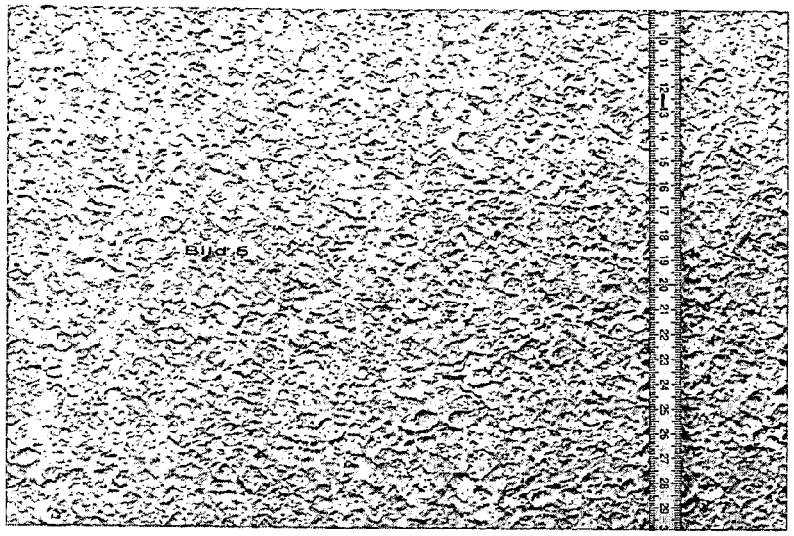
FIG. 5—a surface structure according to the state of the art on the basis of Comparative Example 2 below.
Figure 5A:
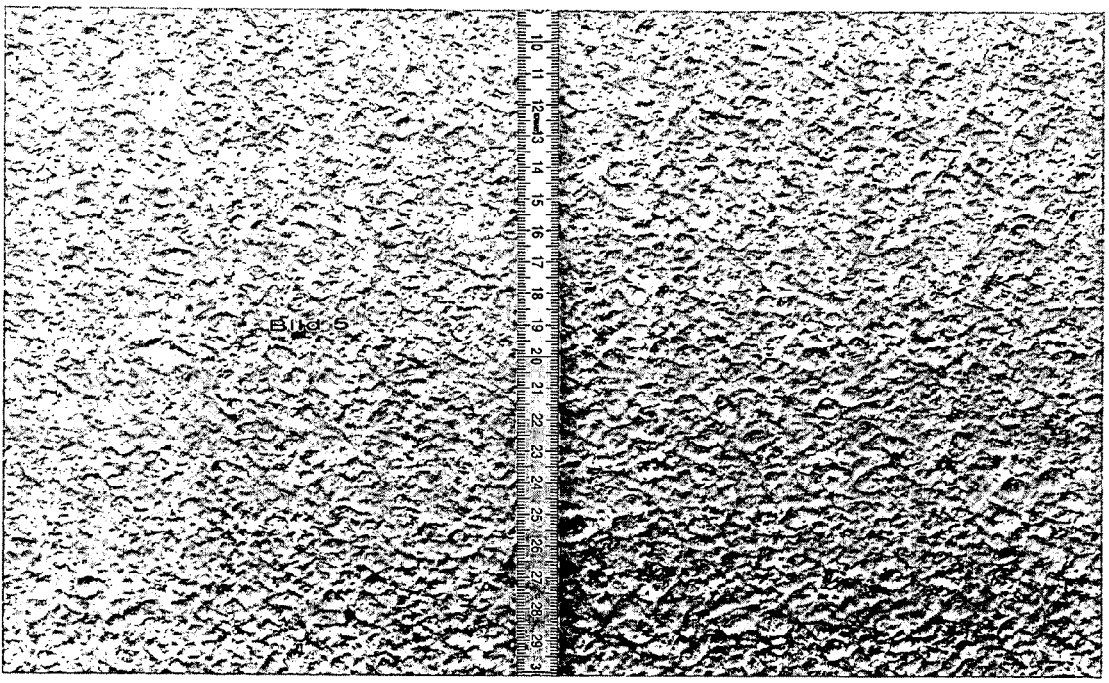
FIGS. 5a and 5b—magnified views of the structure from FIG. 5.
Figure 5B:
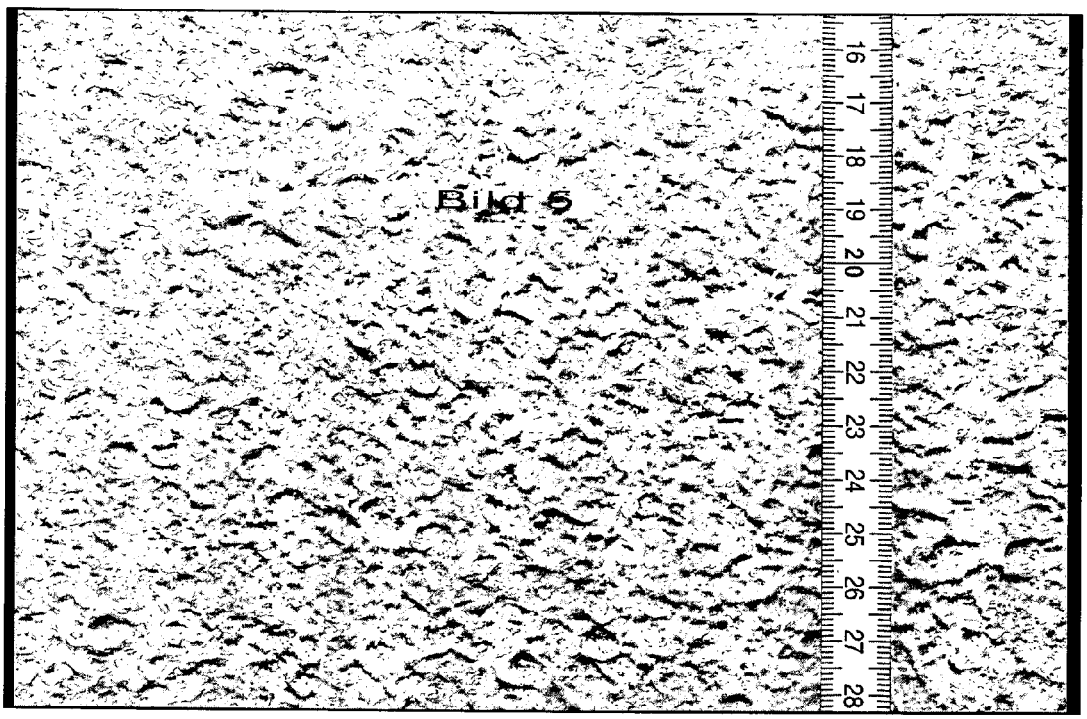

Two liters of water are added to 2 liters (780 grams) of Faserit. Subsequently, the mixture is thoroughly stirred with an agitator. The result is a pasty, sprayable compound that can be sprayed onto a wall employing a commercially available funnel-type spray gun operated using air pressure (1 to 6 bar) with a 4-mm to 8-mm nozzle disk (FIG. 5, FIG. 5a and FIG. 5b).

The viscosity of the coating compound is 4500 mPas.

The Faserit has the following particle-size distribution (with an Alpine air-jet sieve):

| | |
|---|---|
| 27.2% by weight | >40 μm |
| 18.0% by weight | >50 μm |
| 13.6% by weight | >63 μm |
| 12.4% by weight | >90 μm |
| 10.0% by weight | >100 μm. |

The bulk density of the Faserit is 390 g/l and the moisture content is 1.9%.

COMPARATIVE EXAMPLE 3

Figure 6:
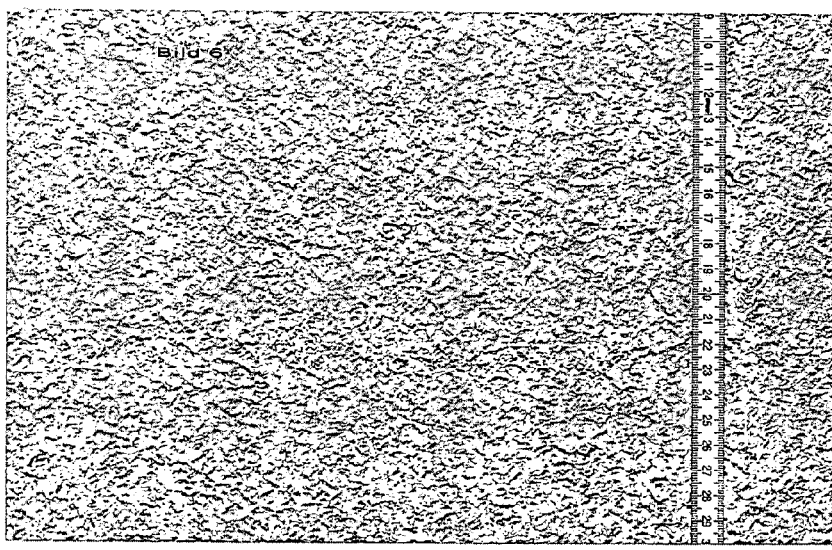
FIG. 6—a surface structure according to the state of the art on the basis of Comparative Example 3 below.
Figure 6A:
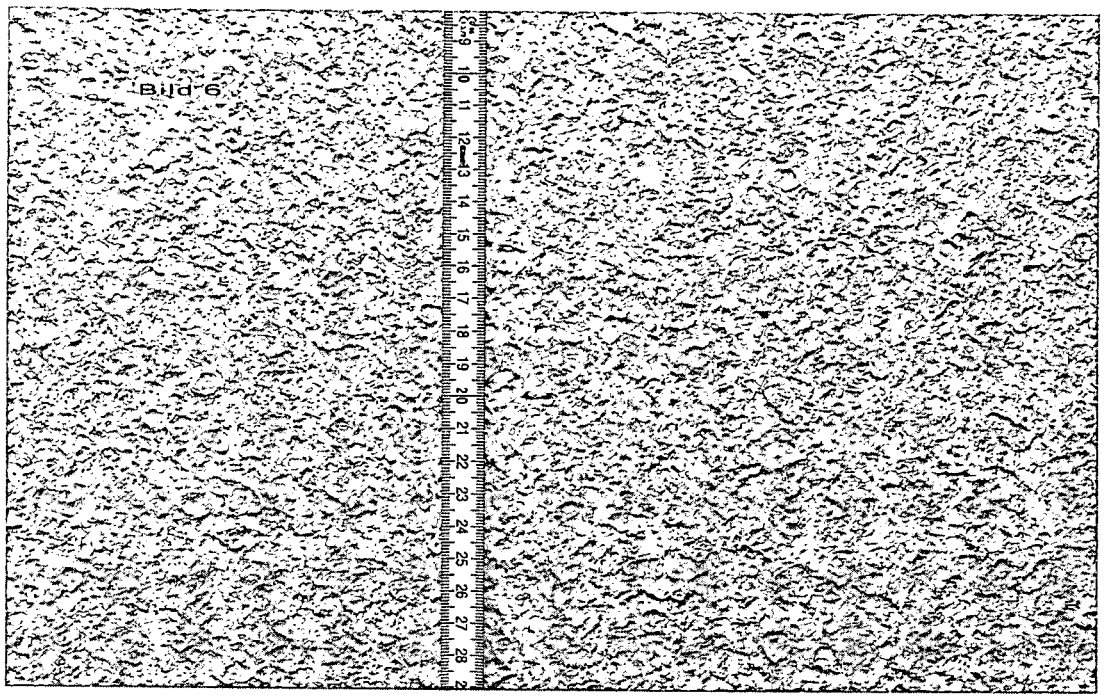
FIGS. 6a and 6b—magnified views of the structure from FIG. 6.
Figure 6B:
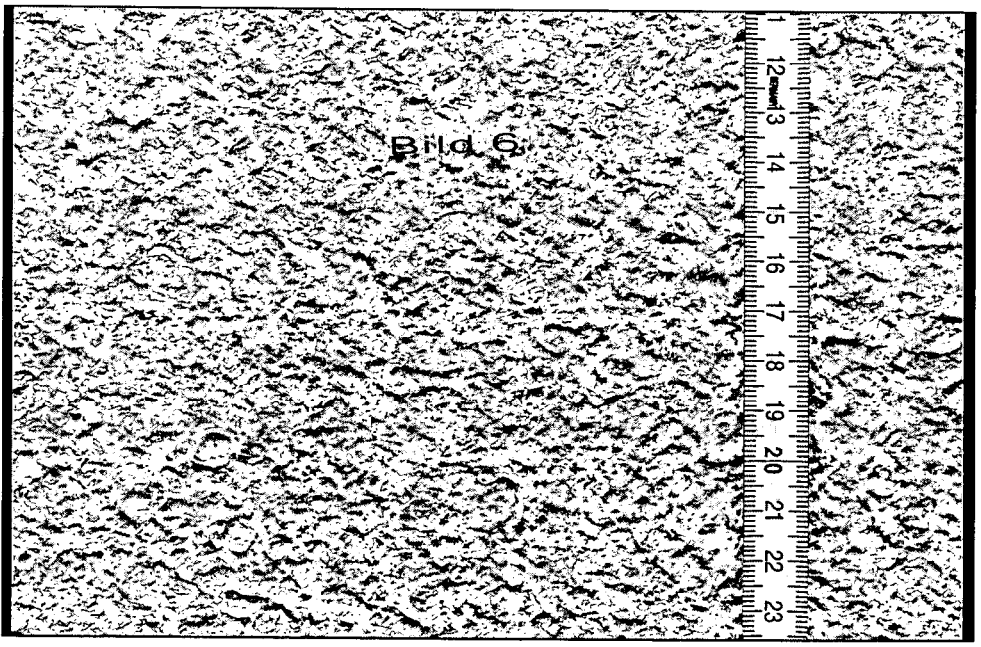

Two liters of water are added to 2 liters (146 grams) of Nature-Floc® Atlanta. Subsequently, the mixture is thoroughly stirred with an agitator. The result is a pasty, sprayable compound that can be sprayed onto a wall employing a commercially available funnel-type spray gun operated using air pressure (1 to 6 bar) with a 4-mm to 8-mm nozzle disk (FIG. 6, FIG. 6a and FIG. 6b).

The viscosity of the coating compound is 4800 mPas.

Nature-Floc® Atlanta has the following particle-size distribution (with an Alpine air-jet sieve):

| | |
|---|---|
| 80.0% by weight | >40 μm |
| 68.6% by weight | >50 μm |
| 56.6% by weight | >63 μm |
| 45.4% by weight | >90 μm |
| 34.8% by weight | >100 μm. |

The bulk density of Nature-Floc® Atlanta is 73 g/l and the moisture content is 5.2%.

COMPARATIVE EXAMPLE 4

Figure 7:
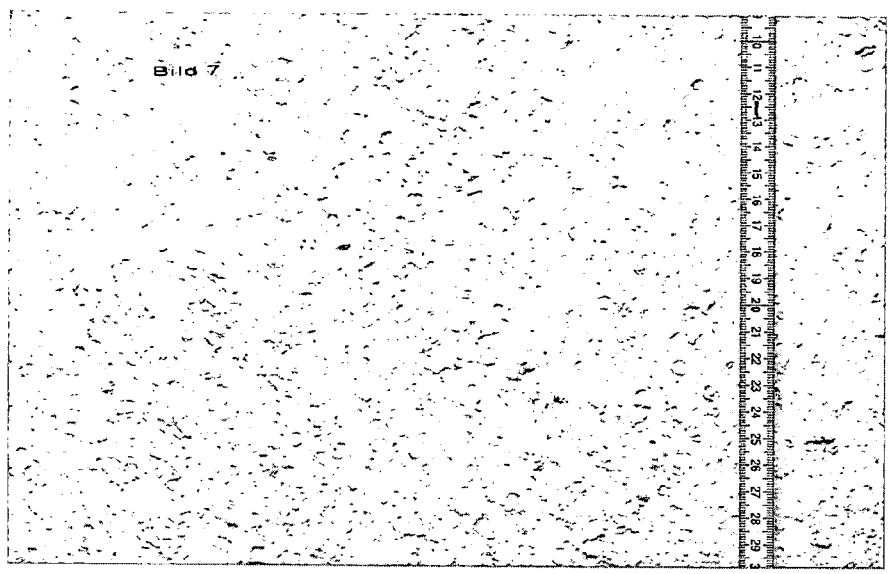
FIG. 7—a surface structure according to the state of the art on the basis of Comparative Example 4 below.
Figure 7A:
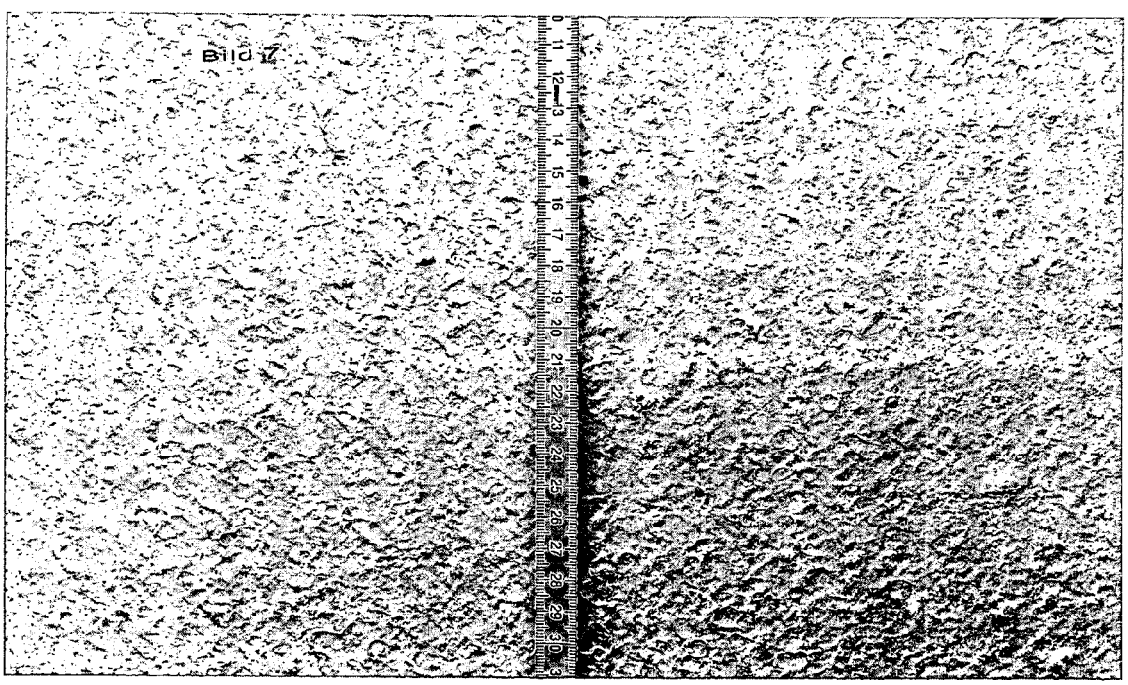
FIGS. 7a and 7b—magnified views of the structure from FIG. 7.
Figure 7B:
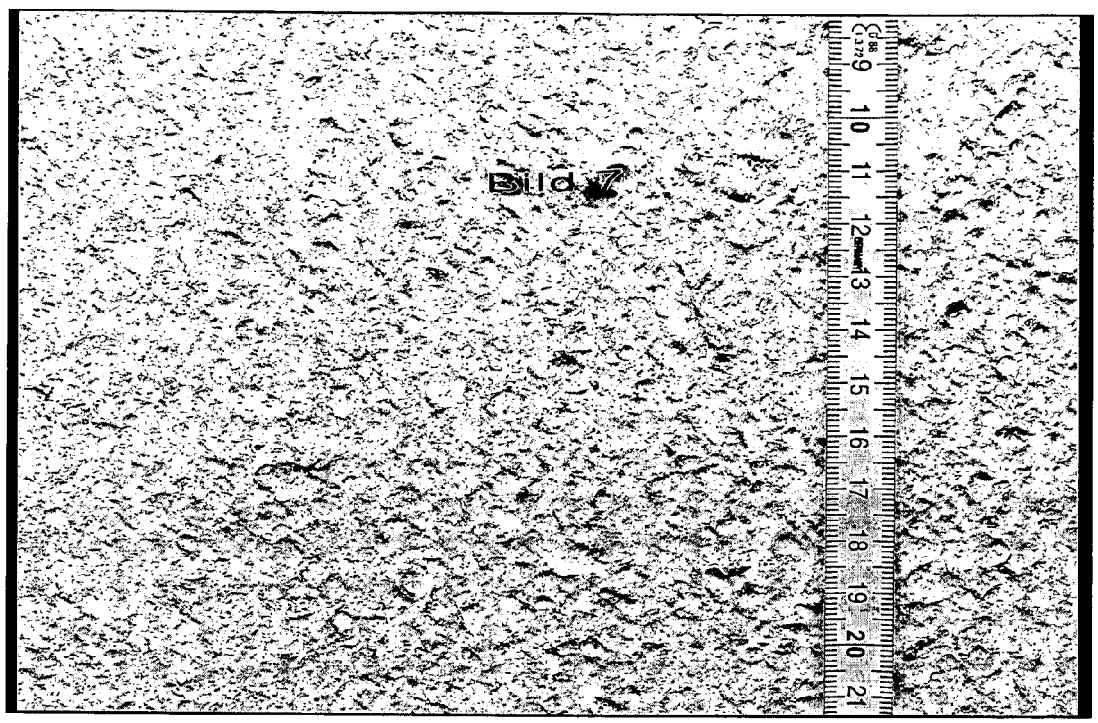

Two liters of water are added to 2 liters (146 grams) of Nature-Floc® California. Subsequently, the mixture is thoroughly stirred with an agitator. The result is a pasty, sprayable compound that can be sprayed onto a wall employing a commercially available funnel-type spray gun operated using air pressure (1 to 6 bar) with a 4-mm to 8-mm nozzle disk (FIG. 7, FIG. 7a and FIG. 7b).

The viscosity of the coating compound is 6600 mPas.

Nature-Floc® California has the following particle-size distribution (with an Alpine air-jet sieve):

| | |
|---|---|
| 78.2% by weight | >40 μm |
| 70.8% by weight | >50 μm |
| 65.0% by weight | >63 μm |
| 59.0% by weight | >90 μm |
| 54.6% by weight | >100 μm. |

The bulk density of Nature-Floc® California is 148 g/l and the moisture content is 3.3%.

EXAMPLE 4

A mixture consisting of
9.0 liters of sieved granules (like in Example 2)
12.5 liters of Caparol Malerit ELF paint and
8.0 liters of water is used to prepare a pasty, sprayable compound analogously to Example 1.

EXAMPLE 5

A mixture consisting of
15.0 liters of sieved granules (like in Example 2)
12.5 liters of Caparol Malerit ELF paint and
10.0 liters of water
300 grams of carboxymethyl cellulose is used to prepare a pasty, sprayable compound analogously to Example 1.

EXAMPLE 6

A mixture consisting of
5.0 liters of sieved granules (like in Example 2)
5.0 liters of cellulose fibers, type 402-2b (like in Example 1)
12.5 liters of Caparol Malerit ELF paint
250 grams of carboxymethyl cellulose is used to prepare a pasty, sprayable compound analogously to Example 1.

EXAMPLE 7

A mixture consisting of
8.0 liters of non-sieved granules (like in Example 1)
2.0 liters of marble meal
12.5 liters of Caparol Malerit ELF paint
15.0 liters of water
300 grams of carboxymethyl cellulose is used to prepare a pasty, sprayable compound analogously to Example 1.

EXAMPLE 8

A mixture consisting of
5.0 liters of coarse granules (like in Example 3)
7.0 kilograms of Caparol Malerit ELF dry paint
10.0 liters of water
250 grams of carboxymethyl cellulose is used to prepare a pasty, sprayable compound analogously to Example 1.

The invention claimed is:

1. A sprayable coating agent in the form of granules containing cellulose and/or regenerated cellulose and/or cellulosic raw materials and/or mixtures thereof with synthetic fibers and/or inorganic fibers and/or inorganic, coarse-grained, fine-grained or pulverulent substances and/or organic polymer materials and/or auxiliaries or additives, whereby the granules have a density of 1 $g/cm^3$ to 5 $g/cm^3$, a moisture content of 1% to 20%, a bulk density of 150 g/l to 1500 g/l and so that the granules, which optionally may be sieved, have the following particle-size distribution:

| | |
|---|---|
| 0.2-5% by weight | <100 µm |
| 1-15% by weight | 100-250 µm |
| 4-25% by weight | 250-400 µm |
| 8-30% by weight | 400-600 µm |
| 10-35% by weight | 600-800 µm |
| 15-40% by weight | 800-1250 µm |
| 7-20% by weight | >1250 µm. |

2. The sprayable coating agent according to claim 1 wherein the density of the granules ranges from 1.2 $g/cm^3$ to 3.1 $g/cm^3$.

3. The sprayable coating agent according to claim 1 wherein the moisture content of the granules ranges from 2% to 12%.

4. The sprayable coating agent according to claim 1 wherein the bulk density of the granules ranges from 170 g/l to 600 g/l.

5. The sprayable coating agent according to claim 1 wherein the cellulose is selected from the group consisting of cotton, linters, pulp, paper, flax, hemp, jute, cuprammonium silk, rayon, lyocel and/or colored fibers.

6. The sprayable coating agent according to claim 1 wherein the cellulosic raw material is wood, wood shavings, sawdust, straw and/or cork.

7. The sprayable coating agent according to claim 1 wherein the proportion of cellulosic granules in the mixture ranges from 40% to 100% by weight.

8. The sprayable coating agent according to claim 1 wherein the mixtures contain auxiliaries and additives in amounts ranging from 0% to 40% by weight.

9. The sprayable coating agent according to claim 1 wherein the proportion of organic polymer materials in the mixture ranges from 0% to 40% by weight.

10. The sprayable coating agent according to claim 9 wherein the auxiliaries and additives are organic or inorganic substances, colorants, binders, curing agents, dispersants, preservatives, fungicides, mica, flame-resistant materials, nanoparticles of any type and/or water.

11. The sprayable coating agent according to claim 10 wherein the colorant is a white or colored organic or inorganic colorant.

12. The sprayable coating agent defined in claim 1 comprising a mixture of pre-ground, non-sieved granules of pulp cellulose as the granules of cellulose, and a colorant as the auxiliary or additive material.

13. The sprayable coating agent according to claim 1 wherein the synthetic fibers are polyester, polyamide, polyacrylonitrile, polyurethane, polyethylene, polypropylene and/or acetate fibers.

14. The sprayable coating agent according to claim 1 wherein the inorganic fibers are silicate, water glass, glass, metal and/or carbon fibers.

15. The sprayable coating agent according to claim 1 wherein the proportion of synthetic fibers in the mixture ranges from 0% to 60% by weight.

16. The sprayable coating agent according to claim 1 wherein the proportion of inorganic fibers in the mixture ranges from 0% to 60% by weight.

17. The sprayable coating agent according to claim 1 wherein the inorganic, coarse-grained, fine-grained or pulverulent substances are marble, quartz sand, silicic acid, chalk, gypsum, carbonates and/or metal oxides.

18. The sprayable coating agent according to claim 1 wherein the proportion of inorganic coarse-grained, fine-grained or pulverulent substances in the mixture ranges from 0% to 40% by weight.

19. The sprayable coating agent according to claim 1 wherein the organic polymer materials are polyethylene, polytetrafluoroethylene, polystyrene foam, acrylates, rubber and/or other modified and unmodified polysaccharides.

20. The sprayable coating agent according to claim 1 wherein the proportion of organic polymer materials in the mixture ranges from 0% to 40% by weight.

21. A sprayable coating agent in the form of granules containing cellulose and/or regenerated cellulose and/or cellulosic raw materials and/or mixtures thereof with synthetic fibers and/or inorganic fibers and/or inorganic, coarse-grained, fine-grained or pulverulent substances and/or organic polymer materials and/or auxiliaries or additives, whereby the granules have a density of 1 g/cm³ to 5 g/cm³, a moisture content of 5.7%, a bulk density of 352 g/l and so the granules have the following particle-size distribution:

| | |
|---|---|
| 2.5% by weight | <100 µm |
| 18.8% by weight | 100-250 µm |
| 7.5% % by weight | 250-400 µm |
| 11.9% by weight | 400-600 µm |
| 27.1% by weight | 800-1250 µm |
| 19.7% by weight | >1250 µm. |

22. A sprayable coating agent in the form of sieved granules containing cellulose and/or regenerated cellulose and/or cellulosic raw materials and/or mixtures thereof with synthetic fibers and/or inorganic fibers and/or inorganic, coarse-grained, fine-grained or pulverulent substances and/or organic polymer materials and/or auxiliaries or additives, whereby the granules have a density of 1 g/cm³ to 5 g/cm³, a moisture content of 5.9%, a bulk density of 326 g/l and so that the sieved granules have the following particle-size distribution:

| | |
|---|---|
| 6.1% by weight | <100 µm |
| 4.3% by weight | 100-250 µm |
| 6.2% by weight | 250-400 µm |
| 14.0% by weight | 400-600 µm |
| 14.5% by weight | 600-800 µm |
| 43.1% by weight | 800-1250 µm |
| 12.0% by weight | >1250 µm. |

23. A sprayable coating agent in the form of granules containing cellulose and/or regenerated cellulose and/or cellulosic raw materials and/or mixtures thereof with synthetic fibers and/or inorganic fibers and/or inorganic, coarse-grained, fine-grained or pulverulent substances and/or organic polymer materials and/or auxiliaries or additives, whereby the granules have a density of 1 g/cm³ to 5 g/cm³, a moisture content of 1% to 20%, a bulk density of 150 g/l to 1500 g/l and so that the granules, which optionally may be sieved, have the following particle-size distribution:

| | |
|---|---|
| 5-10% by weight | <800 µm |
| 10-50% by weight | 800-1250 µm |
| 25-70% by weight | 1250-1600 µm |
| 7-15% by weight | 1600-2000 µm |
| 3-5% by weight | >2000 µm. |

24. The sprayable coating agent according to claim 23 wherein the density of the granules ranges from 1.2 g/cm³ to 3.1 g/cm³.

25. The sprayable coating agent according to claim 23 wherein the moisture content of the granules ranges from 2% to 12%.

26. The sprayable coating agent according to claim 23 wherein the bulk density of the granules ranges from 170 g/l to 600 g/l.

27. The sprayable coating agent according to claim 23 wherein the cellulose is selected from the group consisting of cotton, linters, pulp, paper, flax, hemp, jute, cuprammonium silk, rayon, lyocel and/or colored fibers.

28. The sprayable coating agent according to claim 23 wherein the cellulosic raw material is wood, wood shavings, sawdust, straw and/or cork.

29. The sprayable coating agent according to claim 23 wherein the proportion of cellulosic granules in the mixture ranges from 40% to 100% by weight.

30. The sprayable coating agent according to claim 23 wherein the mixtures contain auxiliaries and additives in amounts ranging from 0% to 40% by weight.

31. The sprayable coating agent according to claim 23 wherein the mixtures contain organic polymers in amounts ranging from 0% to 40% by weight.

32. The sprayable coating agent according to claim 31 wherein the auxiliaries and additives are organic or inorganic substances, colorants, binders, curing agents, dispersants, preservatives, fungicides, mica, flame-resistant materials, nanoparticles of any type and/or water.

33. The sprayable coating agent according to claim 32 wherein the colorant is a white or colored organic or inorganic colorant.

34. The sprayable coating agent defined in claim 23 comprising a mixture of pre-ground, non-sieved granules of pulp cellulose as the granules of cellulose, and a colorant as the auxiliary or additive material.

35. The sprayable coating agent according to claim 23 wherein the synthetic fibers are polyester, polyamide, polyacrylonitrile, polyurethane, polyethylene, polypropylene and/or acetate fibers.

36. The sprayable coating agent according to claim 23 wherein the inorganic fibers are silicate, water glass, glass, metal and/or carbon fibers.

37. The sprayable coating agent according to claim 23 wherein the proportion of synthetic fibers in the mixture ranges from 0% to 60% by weight.

38. The sprayable coating agent according to claim 23 wherein the proportion of inorganic fibers in the mixture ranges from 0% to 60% by weight.

39. The sprayable coating agent according to claim 23 wherein the inorganic, coarse-grained, fine-grained or pulverulent substances are marble, quartz sand, silicic acid, chalk, gypsum, carbonates and/or metal oxides.

40. The sprayable coating agent according to claim 23 wherein the proportion of inorganic coarse-grained, fine-grained or pulverulent substances in the mixture ranges from 0% to 40% by weight.

41. The sprayable coating agent according to claim 23 wherein the organic polymer materials are polyethylene, polypropylene, polytetrafluoroethylene, polystyrene foam, acrylates, rubber and/or other modified and unmodified polysaccharides.

42. The sprayable coating agent according to claim 23 wherein the proportion of organic polymer materials in the mixture ranges from 0% to 40% by weight.

43. A sprayable coating agent in the form of granules containing cellulose and/or regenerated cellulose and/or cellulosic raw materials and/or mixtures thereof with synthetic fibers and/or inorganic fibers and/or inorganic, coarse-grained fine-grained or pulverulent substances and/or organic polymer materials and/or auxiliaries or additives, whereby the granules have a density of 1 g/cm³ to 5 g/cm³, a moisture content of 6.3%, a bulk density of 465 g/l and so that the granules have the following particle-size distribution:

| | |
|---|---|
| 0.4% by weight | <800 µm |
| 9.6% by weight | 800-1250 µm |
| 67.5% by weight | 1250-1600 µm |
| 22.2% by weight | 1600-2000 µm |
| 0.4% by weight | >2000 µm. |

44. A method for making a sprayable coating agent in the form of granules containing cellulose and/or regenerated cellulose and/or cellulosic raw materials and/or mixtures thereof with synthetic fibers and/or inorganic fibers and/or inorganic, coarse-grained, fine-grained or pulverulent substances and/or organic polymer materials and/or auxiliaries or additives, whereby the granules have a density of 1 $g/cm^3$ to 5 $g/cm^3$, a moisture content of 1% to 20%, a bulk density of 150 g/l to 1500 g/l and so that the granules, which optionally may be sieved, have the following particle-size distribution:

| | |
|---|---|
| 0.2-5% by weight | <100 μm |
| 1-15% by weight | 100-250 μm |
| 4-25% by weight | 250-400 μm |
| 8-30% by weight | 400-600 μm |
| 10-35% by weight | 600-800 μm |
| 15-40% by weight | 800-1250 μm |
| 7-20% by weight | >1250 μm | comprising the step of:
(a) grinding up the fibrous and coarse-grained cellulosic starting materials before granulation to obtain a grinding stock having the following particle-size distribution:

| | |
|---|---|
| 40 to 65% by weight | >40 μm |
| 25 to 45% by weight | >50 μm |
| 5 to 20% by weight | >63 μm |
| 0 to 10% by weight | >90 μm |
| 0 to 5% by weight | >100 μm; |

(b) compacting the grinding stock to form a pressed piece of compacted cellulosic material;
(c) granulating the compacted cellulosic material to obtain the cellulosic granules of the abovementioned particle size distribution; and
(d) optionally sieving the cellulosic granules according to step (c).

45. The method for the production of the sprayable coating agent according to claim 44 wherein according to step (b) the starting materials or material mixtures are compacted to form a pressed piece using a contact force ranging from 30 kN to 400 kN.

46. The method for the production of the sprayable coating agent according to claim 45 wherein the starting materials or material mixtures are compacted using a commercially available compactor.

47. The method for the production of the sprayable coating agent according to claim 44 wherein some of the auxiliaries or additives are admixed with the starting materials or material mixtures prior to the compacting, granulating or sieving operations.

48. The method for the production of the sprayable coating agent according to claim 44 wherein water is added to the starting materials or material mixtures prior to the compacting, granulating or sieving operations.

49. The method for the production of the sprayable coating agent according to claim 44 wherein the granules are stirred with water to form a stiff, semi-fluid, pasty coating compound having a viscosity ranging from 300 to 20,000 mPas.

50. The method for the production of the sprayable coating agent according to claim 44 wherein the granules are stirred with water and optionally with conventional auxiliaries and/or additives to form a stiff, semi-fluid, pasty coating compound having a viscosity ranging from 300 to 80,000 mPas.

51. The method for the production of the sprayable coating agent according to claim 44 wherein the granules are stirred with water and optionally with colored fibers and/or metallic fibers and/or metallic particles and/or mother-of-pearl and/or inorganic and/or organic dyed particles in order to achieve certain visual effects so as to form a stiff, semi-fluid, pasty coating compound having a viscosity ranging from 300 to 90,000 mPas.

52. The method for the production of the sprayable coating agent according to claim 51 wherein the stiff, semi-fluid, pasty coating compound contains 5% to 40% by weight of granules, 0% to 60% by weight of water and 0% to 95% by weight of auxiliaries and/or additives.

53. The method for the production of the sprayable coating agent according to claim 44 wherein a dry mixture is prepared that contains 5% to 100% by weight of granules and 0% to 95% by weight of auxiliaries and/or additives.

54. The method for the production of the sprayable coating agent according to claim 53 wherein water is added to the starting materials or material mixtures prior to the compacting, granulating or sieving operations.

55. The method for the production of the sprayable coating agent according to claim 53 wherein the granules are stirred with water to form a stiff, semi-fluid, pasty coating compound having a viscosity ranging from 300 to 20,000 mPas.

56. The method for the production of the sprayable coating agent according to claim 53 wherein the granules are stirred with water and optionally with conventional auxiliaries and/or additives to form a stiff, semi-fluid, pasty coating compound having a viscosity ranging from 300 to 80,000 mPas.

57. The method for the production of the sprayable coating agent according to claim 53 wherein the granules are stirred with water and optionally with colored fibers and/or metallic fibers and/or metallic particles and/or mother-of-pearl and/or inorganic and/or organic dyed particles in order to achieve certain visual effects so as to form a stiff, semi-fluid, pasty coating compound having a viscosity ranging from 300 to 90,000 mPas.

58. The method for the production of the sprayable coating agent according to claim 56 wherein the stiff, semi-fluid, pasty coating compound contains 5% to 40% by weight of granules, 0% to 60% by weight of water and 0% to 95% by weight of auxiliaries and/or additives.

59. A method for making a sprayable coating agent in the form of granules containing cellulose and/or regenerated cellulose and/or cellulosic raw materials and/or mixtures thereof with synthetic fibers and/or inorganic fibers and/or inorganic, coarse-grained, fine-grained or pulverulent substances and/or organic polymer materials and/or auxiliaries or additives, whereby the granules have a density of 1 g/cm3 to 5 g/cm3, a moisture content of 1% to 20%, a bulk density of 150 g/l to 1500 g/l and so that the granules, which optionally may be sieved, have the following particle-size distribution:

| | |
|---|---|
| 5-10% by weight | <800 μm |
| 10-50% by weight | 800-1250 μm |
| 25-70% by weight | 1250-1600 μm |
| 7-15% by weight | 1600-2000 μm |
| 3-5% by weight | >2000 μm | comprising the step of:
(a) grinding up the fibrous and coarse-grained cellulosic starting materials before granulation to obtain a grinding stock having the following particle-size distribution:

| | |
|---|---|
| 40 to 65% by weight | >40 μm |
| 25 to 45% by weight | >50 μm |
| 5 to 20% by weight | >63 μm |
| 0 to 10% by weight | >90 μm |
| 0 to 5% by weight | >100 μm; |

(b) compacting the grinding stock to form a pressed piece of compacted cellulosic material;

(c) granulating the compacted cellulosic material to a obtain the cellulosic granules of the abovementioned particle size distribution; and (d) optionally sieving the cellulosic granules according to step (c).

60. The method for the production of the sprayable coating agent according to claim 59 wherein according to step (b) the starting materials or material mixtures are compacted to form a pressed piece using a contact force ranging from 30 kN to 400 kN.

61. The method for the production of the sprayable coating agent according to claim 60 wherein the starting materials or material mixtures are compacted using a commercially available compactor.

62. The method for the production of the sprayable coating agent according to claim 59 wherein some of the auxiliaries or additives are admixed with the starting materials or material mixtures prior to the compacting, granulating or sieving operations.

63. A method of applying a decorative coating, finishing or structuring to an interior or exterior surface which comprises the step of applying directly onto the interior or exterior surface a sprayable coating agent in the form of granules containing cellulose and/or regenerated cellulose and/or cellulosic raw materials and/or mixtures thereof with synthetic fibers and/or inorganic fibers and/or inorganic, coarse-grained, fine-grained or pulverulent substances and/or organic polymer materials and/or auxiliaries or additives whereby the granules have a density of 1 g/cm³ to 5 g/cm³, a moisture content of 1% to 20%, a bulk density of 150 g/l to 1500 g/l and so that the granules, which optionally may be sieved, have the following particle-size distribution:

| | |
|---|---|
| 0-40% by weight | 0-600 μm |
| 5-55% by weight | 600-1250 μm |
| 5-95% by weight | >1250 μm or |
| 0-15% by weight | 0-800 μm |
| 10-85% by weight | 800-2000 μm |
| 0-15% by weight | >2000 μm. |

64. The method of applying a decorative coating, finishing or structuring to an interior or exterior surface defined in claim 63 wherein the cellulose granules have the following particle-size distribution:

| | |
|---|---|
| 0.2-5% by weight | <100 μm |
| 1-15% by weight | 100-250 μm |
| 4-25% by weight | 250-400 μm |
| 8-30% by weight | 400-600 μm |
| 10-35% by weight | 600-800 μm |
| 15-40% by weight | 800-1250 μm |
| 7-20% by weight | >1250 μm. |

65. The method of applying a decorative coating, finishing or structuring to an interior or exterior surface defined in claim 63 wherein the cellulose granules have the following particle-size distribution:

| | |
|---|---|
| 5-10% by weight | <800 μm |
| 10-50% by weight | 800-1250 μm |
| 25-70% by weight | 1250-1600 μm |
| 7-15% by weight | 1600-2000 μm |
| 3-5% by weight | >2000 μm. |

66. The method of applying a decorative coating, finishing or structuring to an interior or exterior surface defined in claim 63 wherein the sprayable coating agent is a stiff, semi-fluid pasty composition.

67. The method of applying a decorative coating, finishing or structuring to an interior or exterior surface defined in claim 66 wherein the stiff, semi-fluid pasty composition is applied onto the surface to be coated with a spraying device so that a desired surface structure can be set by the granularity of the granules.

68. The method of applying a decorative coating, finishing or structuring to an interior or exterior surface defined in claim 66 wherein the stiff, semi-fluid pasty composition is mixed with water prior to applying the composition directly onto the interior or exterior surface.

69. A sprayable coating agent in the form of dry granules containing cellulose and/or regenerated cellulose and/or cellulosic raw materials and/or mixtures thereof with synthetic fibers and/or inorganic fibers and/or in-organic, coarse-grained, fine-grained or pulverulent substances and/or organic polymer materials and/or auxiliaries or additives, whereby the granules have a density of 1 g/cm³ to 5 g/cm³, a bulk density of 150 g/l to 1500 g/l and so that the granules, which optionally may be sieved, have the following particle-size distribution:

| | |
|---|---|
| 0.2-5% by weight | <100 μm |
| 1-15% by weight | 100-250 μm |
| 4-25% by weight | 250-400 μm |
| 8-30% by weight | 400-600 μm |
| 10-35% by weight | 600-800 μm |
| 15-40% by weight | 800-1250 μm |
| 7-20% by weight | >1250 μm. |

70. A method for making a sprayable coating agent in the form of dry granules containing cellulose and/or regenerated cellulose and/or cellulosic raw materials and/or mixtures thereof with synthetic fibers and/or inorganic fibers and/or inorganic, coarse-grained, fine-grained or pulverulent substances and/or organic polymer materials and/or auxiliaries or additives, whereby the dry granules have a density of 1 g/cm³ to 5 g/cm³, a bulk density of 150 g/l to 1500 g/l and so that the granules, which optionally may be sieved, have the following particle-size distribution:

| | |
|---|---|
| 5-10% by weight | <800 μm |
| 10-50% by weight | 800-1250 μm |
| 25-70% by weight | 1250-1600 μm |
| 7-15% by weight | 1600-2000 μm |
| 3-5% by weight | >2000 μm | comprising the step of:
(a) grinding up the fibrous and coarse-grained cellulosic starting materials before granulation to obtain a dry grinding stock having the following particle-size distribution:

| | |
|---|---|
| 40 to 65% by weight | >40 μm |
| 25 to 45% by weight | >50 μm |
| 5 to 20% by weight | >63 μm |
| 0 to 10% by weight | >901 μm |
| 0 to 5% by weight | >100 μm; |

(b) compacting the dry grinding stock to form a pressed piece of compacted cellulosic material;
(c) granulating the compacted cellulosic material to obtain the dry cellulosic granules of the abovementioned particle size distribution; and
(d) optionally sieving the dry cellulosic granules according to step (c).

71. A method of applying a decorative coating, finishing or structuring to an interior or exterior surface which comprises the step of
(a) preparing the sprayable coating agent in the form of dry granules according to claim 70;
(b) stirring th dry granules containing cellulose with water to form a stiff, semi-fluid, pasty coating composition, suitable for coating a wall or ceiling; and
(c) applying the stiff, semi-fluid, pasty coating composition directly onto the inter exterior surface.

* * * * *

UNITED STATES PATENT AND TRADEMARK OFFICE
CERTIFICATE OF CORRECTION

PATENT NO. : 7,717,996 B2  Page 1 of 1
APPLICATION NO. : 10/530444
DATED : May 18, 2010
INVENTOR(S) : Christian Bumm et al.

It is certified that error appears in the above-identified patent and that said Letters Patent is hereby corrected as shown below:

Title page, item (73), the name of the second assignee that should be <u>added</u> is:

-- Andreas Weigand --

Signed and Sealed this

Seventh Day of September, 2010

David J. Kappos
*Director of the United States Patent and Trademark Office*